(12) United States Patent
Ahn et al.

(10) Patent No.: US 8,739,211 B2
(45) Date of Patent: *May 27, 2014

(54) METHOD AND APPARATUS FOR STORING BROADCAST PROGRAM

(75) Inventors: Jin-yong Ahn, Suwon-si (KR); Soo-kang Bae, Suwon-si (KR); Jung-min Kang, Suwon-si (KR); Du-il Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 194 days.

This patent is subject to a terminal disclaimer.

(21) Appl. No.: 13/292,936

(22) Filed: Nov. 9, 2011

(65) Prior Publication Data

US 2012/0060192 A1 Mar. 8, 2012

Related U.S. Application Data

(63) Continuation of application No. 11/443,172, filed on May 31, 2006, now Pat. No. 8,091,104.

(60) Provisional application No. 60/685,413, filed on May 31, 2005.

(30) Foreign Application Priority Data

Jun. 17, 2005 (KR) ........................ 10-2005-0052545

(51) Int. Cl.
*G06F 3/00* (2006.01)
*G06F 13/00* (2006.01)
*H04N 5/445* (2011.01)

(52) U.S. Cl.
USPC ................... 725/39; 725/32; 725/36; 725/92; 725/100; 725/115; 725/131; 725/136; 725/139; 725/145; 725/151; 707/673; 386/201; 386/239

(58) Field of Classification Search
USPC ............. 725/9–41, 44, 47, 51, 55, 68, 89, 92, 725/100, 115, 131, 132, 134, 139, 142, 145, 725/151; 386/201, 239; 707/673
See application file for complete search history.

(56) References Cited

U.S. PATENT DOCUMENTS

| 5,963,264 A | 10/1999 | Jackson |
| 6,631,523 B1 | 10/2003 | Matthews, III et al. |

(Continued)

FOREIGN PATENT DOCUMENTS

| EP | 1330121 A1 | 7/2003 |
| JP | 10-210378 A | 8/1998 |

(Continued)

*Primary Examiner* — Yassin Alata
(74) *Attorney, Agent, or Firm* — Sughrue Mion, PLLC (57) ABSTRACT

A method and apparatus for storing a broadcast program are provided. The apparatus includes: a signal processing unit which generates an audio/video (A/V) file, an application file, and a first electronic program guide (EPG) file by appropriately processing a plurality of A/V signals, application information, and EPG information, respectively, which are included in an input broadcast program transport stream; a synchronization unit which receives the A/V file, the application file, and the first EPG file from the signal processing unit, generates storage information for the A/V file and storage information for the application file, and converts the first EPG file into a second EPG file comprising the storage information for the A/V file and the storage information for the application file; and a storage unit which stores the A/V file, the application file, and the second EPG file.

11 Claims, 5 Drawing Sheets

(56) References Cited

U.S. PATENT DOCUMENTS

| | | | |
|---|---|---|---|
| 7,072,575 B2 * | 7/2006 | Kang | 386/125 |
| 2002/0009285 A1 * | 1/2002 | Safadi et al. | 386/46 |
| 2002/0040475 A1 * | 4/2002 | Yap et al. | 725/39 |
| 2002/0054752 A1 | 5/2002 | Wood et al. | |
| 2002/0184625 A1 | 12/2002 | Allport | |
| 2002/0186296 A1 | 12/2002 | Gogoi et al. | |
| 2003/0088420 A1 | 5/2003 | alSafadi et al. | |

FOREIGN PATENT DOCUMENTS

| | | |
|---|---|---|
| KR | 10-2001-0047470 A | 6/2001 |
| KR | 10-2001-0068851 A | 7/2001 |
| WO | 02/19691 A2 | 3/2002 |
| WO | 02/32139 A2 | 4/2002 |

* cited by examiner

METHOD AND APPARATUS FOR STORING BROADCAST PROGRAM

CROSS-REFERENCE TO RELATED PATENT APPLICATION

This application is a continuation of U.S. application Ser. No. 11/443,172 filed May 31, 2006, which claims the benefit of priority from Korean Patent Application No. 10-2005-0052545 filed Jun. 17, 2005, and from U.S. Provisional Application No. 60/685,413 filed May 31, 2005, the disclosures of which are incorporated by reference herein in their entirety.

BACKGROUND OF THE INVENTION

1. Field of the Invention

The present invention relates to a method and apparatus for storing a broadcast program, and more particularly, to a method and apparatus for storing a broadcast program in which a broadcast program is stored with reference to electronic program guide (EPG) information and application information which are transmitted together with an audio/video signal.

2. Description of the Related Art

In recent years, digital broadcast receivers including storage media with a large storage capacity (e.g., hard discs) have been developed and commercialized. Digital broadcast receivers receive broadcast programs chosen by users and store the received broadcast programs in their own storage media. Digital broadcast receivers are expected to completely replace conventional video cassette recorders (VCRs) when digital broadcasting becomes more widespread in the next few years.

However, conventional digital broadcast receivers can store only audio/video (A/V) signals using electronic program guide (EPG) information. Even when broadcast programs include application information regarding A/V signals, conventional digital broadcast receivers can store only the A/V signals. Thus, when watching stored broadcast programs that have been previously broadcast, users may not be provided with all of the services that are provided if they had watched the broadcast programs as the programs were broadcast.

In order to solve the above problem with conventional digital broadcast receivers, a method of storing an entire broadcast program transport stream may be used. According to this method, however, unnecessary A/V signals that users do not wish to receive and EPG information regarding the unnecessary A/V signals may be stored. In addition, according to this method, all application information that is repeatedly transmitted by a broadcasting station may be stored regardless of whether it is duplicate application information, thereby causing a shortage of storage capacity. Moreover, according to this method, a broadcast program transport stream must be reconstructed based on A/V signals, application information, and EPG information, which is separated therefrom in order to use a corresponding broadcast program with other broadcast programs stored in advance.

SUMMARY OF THE INVENTION

The present invention provides a method and apparatus for storing a broadcast program in a digital broadcast reception environment in which an audio/video signal, application information and electronic program guide (EPG) information, which are included in a broadcast program, are stored in conjunction with one another.

The present invention also provides a method and apparatus for storing a broadcast program in a digital broadcast reception environment in which an audio/video signal, application information and electronic program guide (EPG) information, which are included in a broadcast program, are appropriately processed and then stored as a file.

According to an aspect of the present invention, there is provided an apparatus for storing a broadcast program. The apparatus includes: a signal processing unit which generates an audio/video (A/V) file, an application file, and an electronic program guide (EPG) file by appropriately processing a plurality of A/V signals, application information, and EPG information, respectively, included in an input broadcast program transport stream; a synchronization unit which receives the A/V file, the application file, and the EPG file from the signal processing unit, generates storage information for the A/V file and the application file, and converts the EPG file into EPG information containing the storage information for the A/V file and the application file; and a storage unit which stores the A/V file, the application file, and the EPG file containing the storage information for the A/V file and the application file.

According to another aspect of the present invention, there is provided an apparatus for storing a broadcast program. The apparatus includes: a signal processing unit which generates an audio/video (A/V) file, an application file, and an electronic program guide (EPG) file by appropriately processing a plurality of A/V signals, application information, and EPG information, respectively, included in an input broadcast program transport stream; a synchronization unit which generates a synchronization file that synchronizes the A/V file, the application file, and the EPG file; and a storage unit which stores the A/V file, the application file, the EPG file, and the synchronization file.

According to another aspect of the present invention, there is provided a method of storing a broadcast program. The method includes: generating an A/V file, an application file, and an EPG file by appropriately processing a plurality of A/V signals, application information, and EPG information, respectively, included in an input broadcast program transport stream; receiving the A/V file, the application file, and the EPG file, generating storage information for the A/V file and the application file, and converting the EPG file into EPG information containing the storage information for the A/V file and the application file; and storing the A/V file, the application file, and the EPG file containing the storage information for the A/V file and the application file.

According to another aspect of the present invention, there is provided a method of storing a broadcast program. The method includes: generating an A/V file, an application file, and an EPG file by appropriately processing a plurality of A/V signals, application information, and EPG information, respectively, included in an input broadcast program transport stream; generating a synchronization file that synchronizes the A/V file, the application file, and the EPG file; and storing the A/V file, the application file, the EPG file, and the synchronization file.

According to another aspect of the present invention, there is provided a computer-readable recording medium storing a computer program for executing a method of storing a broadcast program, the method including: generating an A/V file, an application file, and an EPG file by appropriately processing a plurality of A/V signals, application information, and EPG information, respectively, included in an input broadcast program transport stream; receiving the A/V file, the application file, and the EPG file, generating storage information for the A/V file and the application file, and converting the EPG file into EPG information containing the storage information for the A/V file and the application file; and storing the A/V file, the application file, and the EPG file containing the storage information for the A/V file and the application file.

According to another aspect of the present invention, there is provided a computer-readable recording medium storing a computer program for executing a method of storing a broadcast program, the method including: generating an A/V file, an application file, and an EPG file by appropriately processing a plurality of A/V signals, application information, and EPG information, respectively, included in an input broadcast program transport stream; generating a synchronization file that synchronizes the A/V file, the application file, and the EPG file; and storing the A/V file, the application file, the EPG file, and the synchronization file.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings in which exemplary embodiments of the invention are shown.

Figure 1:
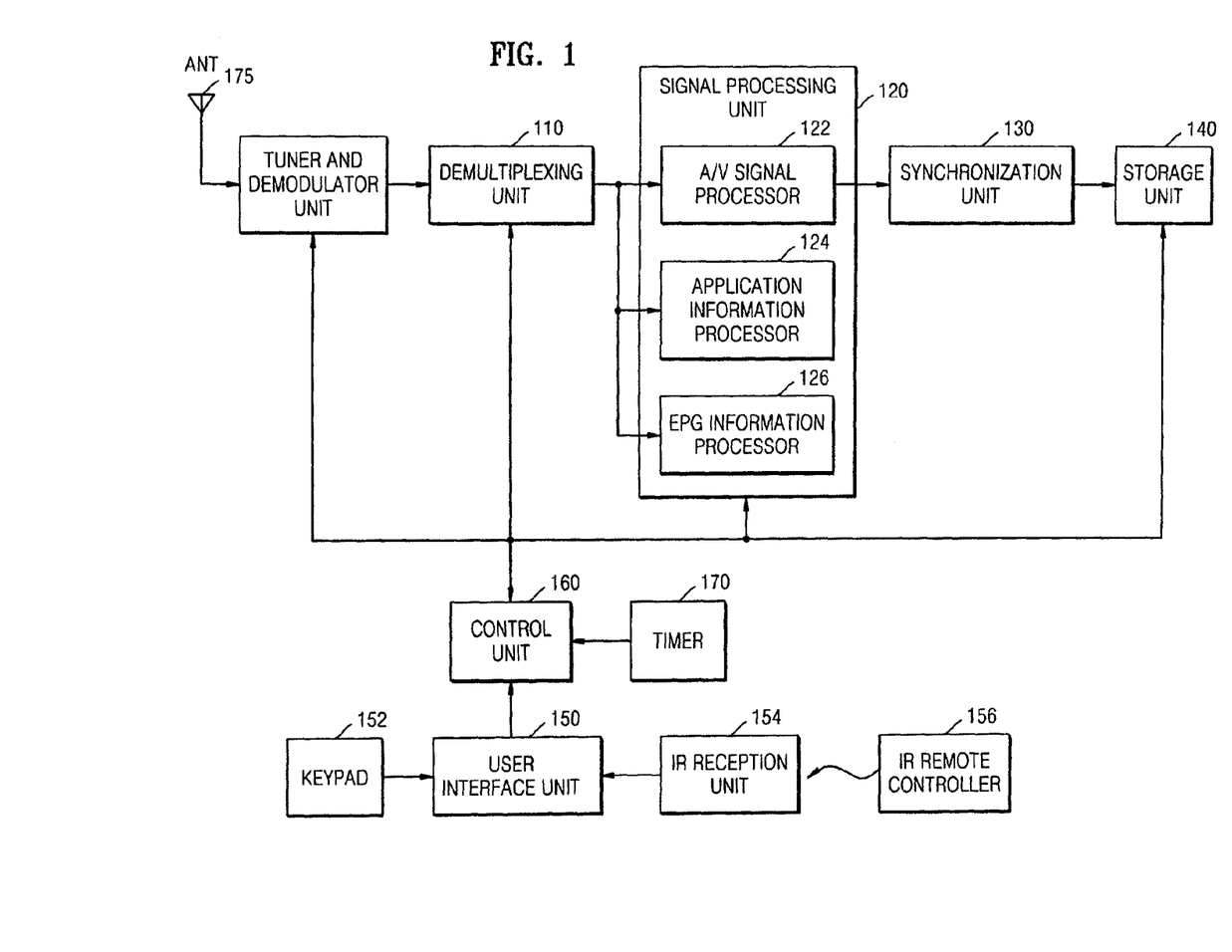
FIG. 1 is a block diagram of an apparatus for storing a broadcast program according to an exemplary embodiment of the present invention.

FIG. 1 is a block diagram of an apparatus for storing a broadcast program according to an exemplary embodiment of the present invention. Referring to FIG. 1, the apparatus includes a tuner and demodulator unit 100, a demultiplexing unit 110, a signal processing unit 120, a synchronization unit 130, a storage unit 140, a user interface unit 150, and a control unit 160. The signal processing unit 120 includes an audio/video signal processor 122, an application information processor 124, and an electronic program guide (EPG) information processor 126.

The apparatus receives a broadcast program transport stream encoded according to predetermined broadcast program standards. A plurality of transport streams generated by a plurality of broadcasting stations are multiplexed into the broadcast program transport stream, and the broadcast program transport stream is received by the apparatus via a single bandwidth channel. The broadcast program includes A/V signals produced by the broadcasting stations, application information regarding application programs providing various additional services to a user, and EPG information helping the user to choose a broadcast program that the user wishes to watch. The application information and the EPG information are located in a predetermined portion of a data stream.

The tuner and demodulator unit 100 receives a broadcast program transport stream via an antenna (ANT) 175 under the control of the control unit 160, demodulates the broadcast program transport stream, and transmits the demodulated data to the demultiplexing unit 110.

The demultiplexing unit 110 demultiplexes the demodulated data transmitted by the tuner and demodulator unit 100 into A/V signals, application information and EPG information. The demultiplexing unit 110 then transmits the A/V signals, the application information, and the EPG information to the A/V signal processor 122, the application information processor 124, and the EPG information processor 126, respectively, which are included in the signal processing unit 120.

The A/V signal processor 122 processes the A/V signals transmitted by the demultiplexing unit 110, thereby forming an A/V file. In detail, the A/V signal processor 122 deletes some of the A/V signals that are determined by a user, with the aid of the user interface unit 150, as being signals which are not to be stored and packages the remaining undeleted A/V signals as an A/V file. Here, the generation of an A/V file includes generating an A/V file having a regular file format based on A/V signals which have a demultiplexed transport stream format and which are mapped according to predetermined broadcast program standards.

Alternatively, the A/V signal processor 122 may generate an A/V file by allowing the user to determine which of the A/V signals are to be stored with the aid of the user interface unit 150 and by packaging only the A/V signals chosen by the user, instead of allowing the user to determine which of the A/V signals are not to be stored, deleting the A/V signals determined by the user as being signals that are not to be stored, and by packaging the remaining undeleted A/V signals that are left undeleted.

The application information processor 124 processes the application information that is transmitted by the demultiplexing unit 110, thereby generating an application file. The generation of an application file includes generating an application file having a regular file format based on application information which has a demultiplexed transport stream format and which is mapped according to predetermined broadcast program standards.

The application information processor 124 generates an application file based on only the application information deemed to be necessary by the user with the aid of the user interface unit 150. In general, application information that is included in a broadcast program is repeatedly transmitted because it is almost impossible to determine when a user will watch or record the broadcast program. Therefore, the application information processor 124 deletes duplicate application information from the application information received from the demultiplexing unit 110, thereby preventing the same application information from being repeatedly stored. Therefore, it is possible to enhance storage efficiency by deleting duplicate application information. In addition, it is possible to increase the operating speed of the apparatus of FIG. 1 by preventing unnecessary storage processes from being repeatedly carried out.

The EPG information processor 126 processes the EPG information transmitted by the demultiplexing unit 110, thereby forming an EPG file. Here, the generation of an EPG file includes generating an EPG file having a regular file format based on EPG information which has a demultiplexed transport stream format and which is mapped according to predetermined broadcast program standards. The EPG file may be, for example, an Extensible Mark-up Language (XML) file or a metadata file (according to the Movie Picture Video (MPV) standard).

In detail, the EPG information processor 126 deletes unnecessary portions of the EPG information transmitted by the demultiplexing unit 110 and generates an EPG file using the remaining undeleted portions of the EPG information that is left undeleted. If there is additional information that needs to be added to the EPG information transmitted by the demultiplexing unit 110, the EPG information processor 126 processes the EPG information transmitted by the demultiplexing unit 110 so that the additional information can be added to a predetermined portion of the EPG information transmitted by the demultiplexing unit 110.

In addition, the EPG information processor 126 processes the EPG information transmitted by the demultiplexing unit 110 so that an invalidation flag for invalidating time information can be inserted into a time information-related portion of the EPG information transmitted by the demultiplexing unit 110. The invalidation flag prevents the user from being confused into thinking that the user is watching a broadcast program that is currently being broadcast while watching a playback of a previously recorded broadcast program. Here, unnecessary EPG information is EPG information regarding the A/V signals that have been determined by the user as being signals that are not to be stored. The user may deem unnecessary some of the A/V signals included in the broadcast program input to the apparatus of FIG. 1 by using the user interface unit 150. Then, the A/V signal processor 122 may delete the A/V signals that are deemed unnecessary by the user. The unnecessary EPG information has been described above as being related to the A/V signals that have been deemed unnecessary by the user with the aid of the user interface unit 150. However, the unnecessary EPG information may comprise EPG information deemed unnecessary according to preprogrammed information in the EPG information processor 126.

Examples of additional information that may be added to the predetermined portion of the EPG information transmitted by the demultiplexing unit 110 include storage time information, storage device information, and additional broadcast program description information generated by the user.

As one example of such additional information, storage information specifying where in the storage unit 140 a broadcast program is stored may be added to the predetermined portion of the EPG information transmitted by the demultiplexing unit 110.

Alternatively, as another example of additional information, additional broadcast program description information generated by the user may be added to the predetermined portion of the EPG information transmitted by the demultiplexing unit 110. The predetermined portion of the EPG information transmitted by the demultiplexing unit 110, to which the additional information can be added, may be part of the corresponding EPG information from which a portion deemed unnecessary has been deleted.

The synchronization unit 130 receives an A/V file, an application file, and an EPG file from the A/V signal processor 122, the application information processor 124, and the EPG information processor 126, respectively. Thereafter, the synchronization unit 130 synchronizes the A/V file, the application file, and the EPG file and may perform such synchronization with one another in one of two exemplary approaches outlined below.

In the first approach, the synchronization unit 130 may generate a synchronization file that synchronizes the A/V file, the application file, and the EPG file with one another. The synchronization file may be an XML file or a metadata file that correlates directories in which the A/V file, the application file, and the EPG file are to be respectively stored and/or correlates the names of the A/V file, the application file, and the EPG file.

In the second approach, the synchronization unit 130 may generate storage information for each of the A/V file and the application file and may convert the EPG file into an EPG file containing the storage information regarding the A/V file and the application file. Here, the storage information generated for the A/V file and the application file specifies the locations of directories in the storage unit 140 where the A/V file and the application file are to be stored and/or specifies the names of the A/V file and the application file. However, the synchronization unit 130 may synchronize the A/V file, the application file, and the EPG file with one another in an approach other than the exemplary first and second approaches set forth above. For example, the synchronization unit 130 may generate storage information regarding the A/V file and storage information regarding the application file, and may then convert one of the A/V file, the application file, and the EPG file into a converted file comprising the storage information regarding the A/V file and the storage information regarding the application file. The storage unit 140 may then store the converted file, comprising the storage information regarding the A/V file and the storage information regarding the application file, and may store remaining files among the A/V file, the application file, and the EPG file, which were not converted. Or, for example, the synchronization unit 130 may generate a storage information file comprising the storage information regarding the A/V file and the storage information regarding the application file, and the storage unit 140 may then store the A/V file, the application file, the EPG file and the storage information file.

The storage unit 140 may be, for example, an MPEG memory, a hard disc, an electrically erasable programmable read-only memory (EEPROM), a random access memory (RAM), or a read only memory (ROM).

The storage unit 140 may receive the A/V file, the application file, and the EPG file, and the synchronization file from the synchronization unit 130 and then store them. Alternatively, the storage unit 140 may receive the A/V file, the application file, and the EPG information containing the storage information regarding the A/V file and the application file from the synchronization unit 130 and then store them.

The user interface unit 150 is connected to the control unit 160 and provides an input/output interface that receives a command from the user that is required for controlling the apparatus of FIG. 1. In detail, the user interface unit 150 may comprise an infrared (IR) reception unit 154, which executes a command input via a keypad 152 or an IR remote controller 156. The IR remote controller 156 may be, for instance, a wireless mouse, such as an Air Mouse, or a typical remote controller.

Figure 2:
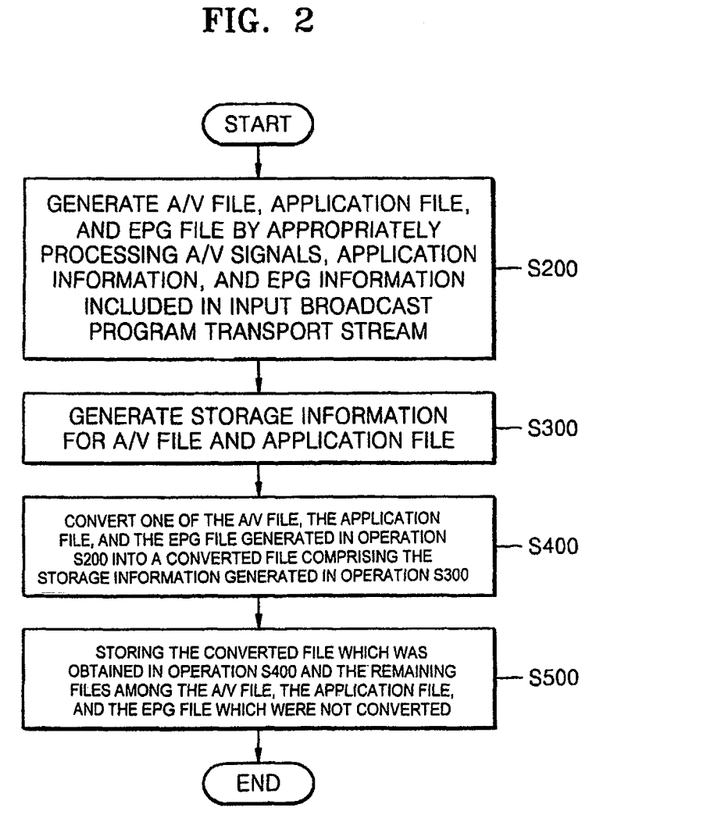
FIG. 2 is a flowchart illustrating a method of storing a broadcast program according to an exemplary embodiment of the present invention.

FIG. 2 is a flowchart illustrating a method of storing a broadcast program according to an exemplary embodiment of the present invention. Referring to FIG. 2, in operation S200, an A/V file is generated by appropriately processing a plurality of A/V signals which are demultiplexed from an input broadcast program transport stream and have a transport stream format, an application file is generated by appropriately processing application information which is also demultiplexed from the input broadcast program transport stream and has a transport stream format, and an EPG file is generated by appropriately processing EPG information which is also demultiplexed from the input broadcast program transport stream and has a transport stream format. Operation S200 will be described in further detail below with reference to FIG. 3.

In operation S300, storage information is generated for each of the A/V file and the application file. The storage information specifies the locations of directories in the storage unit 140 where the A/V file and the application file are to be stored or the names of the A/V file and the application file.

In operation S400, one of the A/V file, the application file, and the EPG file is converted into a converted file comprising the storage information generated in operation S300.

In operation S500, the converted file which was obtained in operation S400 and the remaining files among the A/V file, the application file, and the EPG file which were not converted are stored.

Figure 3:
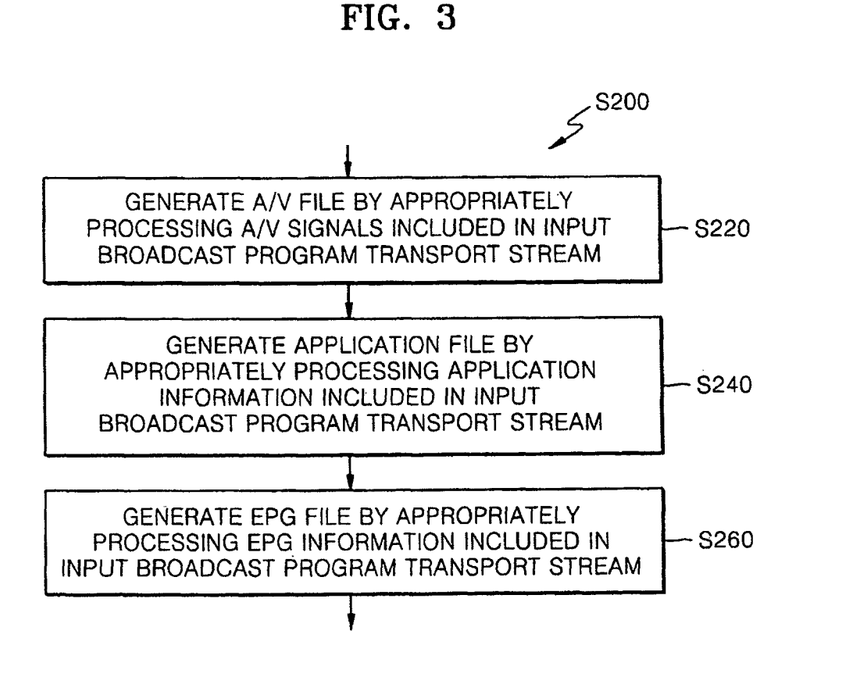
FIG. 3 is a detailed flowchart illustrating operation S200 of FIG. 2 according to an exemplary embodiment of the present invention.

FIG. 3 is a detailed flowchart illustrating operation S200 of FIG. 2 according to an exemplary embodiment of the present invention. Referring to FIG. 3, in operation S220, an A/V file is generated by appropriately processing a plurality of A/V signals which are demultiplexed from an input broadcast program transport stream and have a transport stream format. In operation S240, an application file is generated by appropriately processing application information which is also demultiplexed from the input broadcast program transport stream and has a transport stream format. In operation S260, an EPG file is generated by appropriately processing EPG information which is also demultiplexed from the input broadcast program transport stream and has a transport stream format. Operations S220, S240, and S260 will be described in further detail below with reference to FIGS. 4, 5, and 6, respectively.

Figure 4:
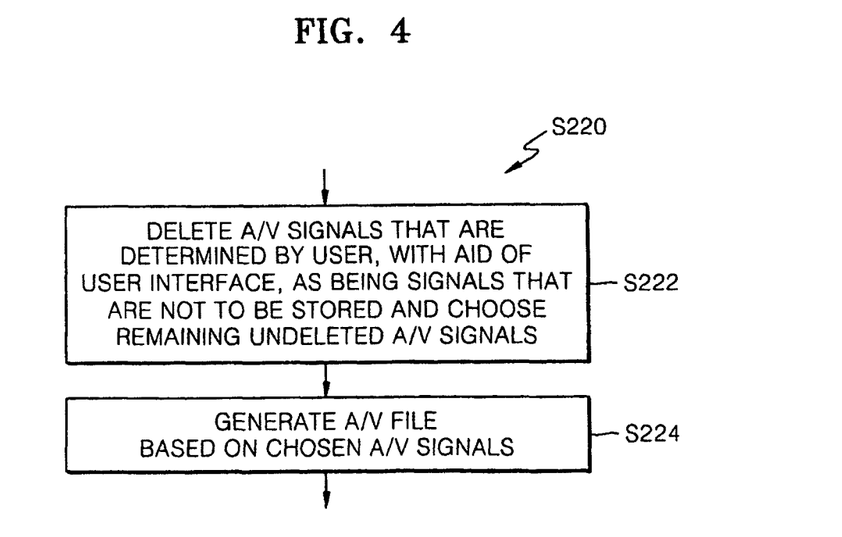
FIG. 4 is a detailed flowchart illustrating operation S220 of FIG. 3 according to an exemplary embodiment of the present invention.

FIG. 4 is a detailed flowchart illustrating operation S220 of FIG. 3 according to an exemplary embodiment of the present invention. Referring to FIG. 4, in operation S222, some of a plurality of A/V signals included in an input broadcast program transport stream that are determined by a user with the aid of a user interface as being signals that are not to be stored are deleted, and the remaining undeleted A/V signals are chosen.

In operation S224, an A/V file is generated by packaging the undeleted A/V signals. The generation of an A/V file may include generating an A/V file having a regular file format based on A/V signals which have a transport stream format and are mapped according to predetermined broadcast program standards. Alternatively, in operation S224, an A/V file may be generated by allowing the user to determine which of the A/V signals included in the input broadcast program transport stream are to be stored and packaging only the A/V signals determined by the user as being signals that are to be stored, instead of allowing the user to determine which of the A/V signals included in the input broadcast program transport stream are not to be stored, deleting the A/V signals that are determined by the user as being signals that are not to be stored, and packaging only the remaining undeleted A/V signals.

Operations S222 and S224 are illustrated in FIG. 4 as being sequentially carried out, but operation S222 is optional.

Figure 5:
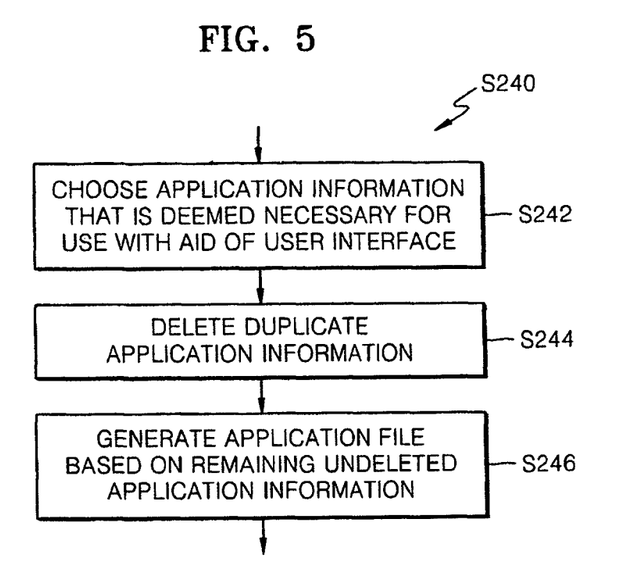
FIG. 5 is a detailed flowchart illustrating operation S240 of FIG. 3 according to an exemplary embodiment of the present invention.

FIG. 5 is a detailed flowchart illustrating operation S240 of FIG. 3 according to an exemplary embodiment of the present invention. Referring to FIG. 5, in operation S242, only some application information included in an input broadcast program transport stream that is deemed necessary by a user with the aid of a user interface is chosen.

In operation S244, duplicate application information is deleted from the chosen application information. In general, application information included in a broadcast program is repeatedly transmitted because it is almost impossible to determine when the user will watch or record the broadcast program. Therefore, in operation S244, duplicate application information is deleted from the chosen application information, thereby preventing the same application information from being repeatedly stored.

In operation S246, an application file is generated using the remaining undeleted chosen application information. The generation of an application file includes generating an application file based on application information which has a transport stream format and is mapped according to predetermined broadcast program standards. Alternatively, in operation S246, an application file may be generated by allowing the user to determine which of the application information included in the input broadcast program transport stream is not to be stored, deleting the application information determined by the user as being information that is not to be stored, and packaging only the remaining undeleted application information, instead of allowing the user to determine which of the application information included in the input broadcast program transport stream is to be stored and packaging only the application information determined to be stored by the user.

Operations S242, S244, and S246 are illustrated in FIG. 5 as being sequentially carried out, but they may be carried out in a different order than the one set forth herein. In addition, operations S242 and S244 are optional.

Figure 6:
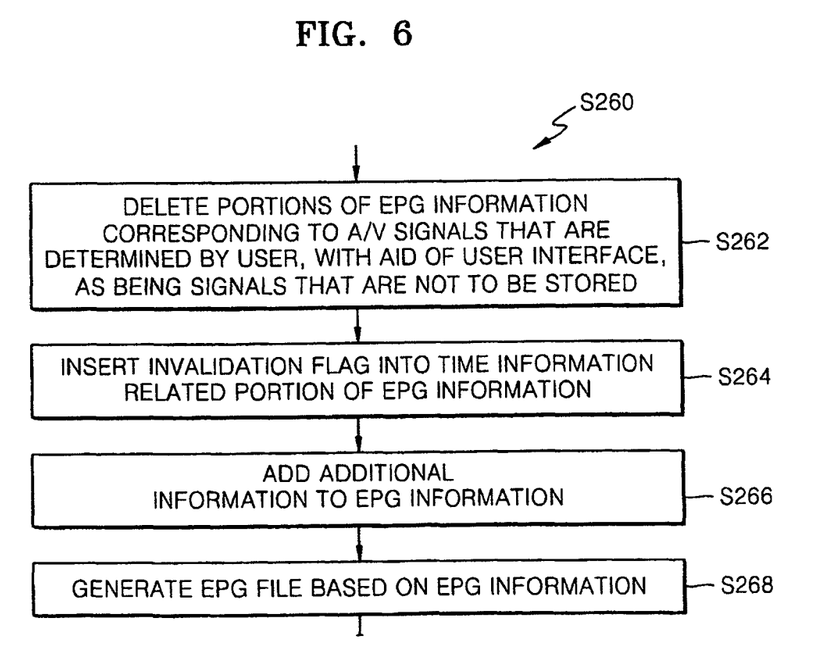
FIG. 6 is a detailed flowchart illustrating operation S260 of FIG. 3 according to an exemplary embodiment of the present invention.

FIG. 6 is a detailed flowchart illustrating operation S260 of FIG. 3 according to an exemplary embodiment of the present invention. Referring to FIG. 6, in operation S262, portions of EPG information included in an input broadcast program transport stream that correspond to A/V signals that have been determined by a user with the aid of a user interface as being signals that are not to be stored are deleted.

In operation S264, an invalidation flag is inserted into a portion of the EPG information related to time information, thereby preventing the user from being confused into thinking that the user is watching a real-time broadcast program while watching a playback of a previously recorded broadcast program.

In operation S266, additional information is added to the EPG information. Examples of such additional information include storage time information, storage device information, and additional broadcast program description information generated by the user.

In operation S268, an EPG file is generated using the EPG information. The generation of an EPG file includes generating an EPG file based on EPG information, which has a transport stream format and is mapped according to predetermined broadcast program standards.

Operations S262, S264, S266, and S268 are illustrated in FIG. 6 as being sequentially carried out, but they may be carried out in a different order than the one set forth herein. For example, operations S268 and S266 may be sequentially carried out so that an EPG file is generated and then additional information is added to the EPG file.

Figure 7:
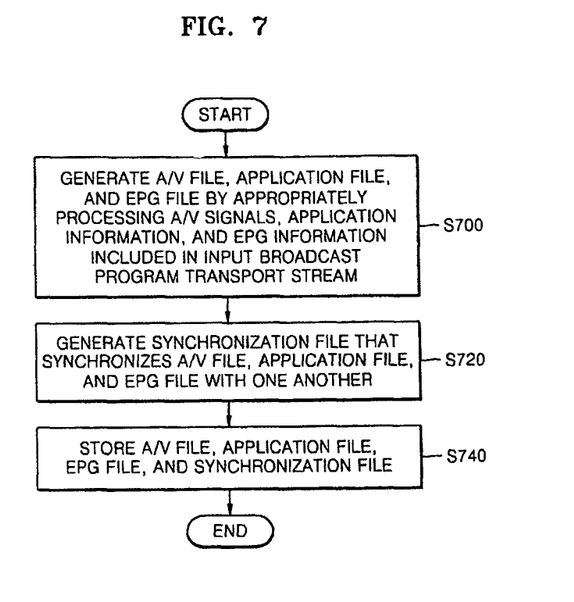
FIG. 7 is a flowchart illustrating a method of storing a broadcast program according to another exemplary embodiment of the present invention.

FIG. 7 is a flowchart illustrating a method of storing a broadcast program according to another exemplary embodiment of the present invention. Referring to FIG. 7, in operation S700, an A/V file is generated by appropriately processing a plurality of A/V signals, which are demultiplexed from an input broadcast program transport stream and have a transport stream format, an application file is generated by appropriately processing application information, which is also demultiplexed from the input broadcast program transport stream and has a transport stream format, and an EPG file is generated by appropriately processing EPG information, which is also demultiplexed from the input broadcast program transport stream and has a transport stream format.

In operation S720, a synchronization file that synchronizes the A/V file, the application file, and the EPG file is generated. The synchronization file may be an XML file or a metadata file that correlates the names of directories where the A/V file, the application file, and the EPG file are respectively stored or the respective names of the A/V file, the application file, and the EPG file.

In operation S740, the A/V file, the application file, the EPG file, and the synchronization file are stored.

The present invention can be realized as computer-readable code written on a computer-readable recording medium. The computer-readable recording medium may be any type of recording device in which data is stored in a computer-readable manner. Examples of the computer-readable recording medium include, but are not limited to, a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that a computer-readable code is written thereto and executed therefrom in a decentralized manner. Functional programs, code, and code segments needed for realizing the present invention can be easily understood by one of ordinary skill in the art.

As described above, in the method and apparatus for storing a broadcast program according to exemplary embodiments of the present invention, if there is application information related to A/V signals included in a broadcast program, the application information is stored together with the broadcast program. Thus, even when watching a stored broadcast program, a user can be provided with all of the services that are provided when watching a program as it is broadcast.

In addition, according to exemplary embodiments of the present invention it is possible to store a broadcast program on storage media with a small storage capacity by deleting unnecessary A/V signals that the user does not wish to receive, EPG information corresponding to the unnecessary A/V signals, and duplicate application information.

Moreover, it is possible for the user to use a broadcast program with other broadcast programs that have been previously stored by storing the broadcast program as an XML file or a metadata file. Furthermore, there is no need to perform additional processes, such as the separation of an A/V file, an application file, and an EPG file from a broadcast program signal and then the reconstructing of the broadcast program signal based on the separated data.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for storing a broadcast program, the apparatus comprising:
    a signal processing unit which generates an audio/video (A/V) file, an application file, and an electronic program guide (EPG) file by processing A/V signals, application information, and EPG information, respectively, which are included in a broadcast program transport stream;
    a synchronization unit which receives the A/V file, the application file, and the EPG file from the signal processing unit, generates storage information for the A/V file, storage information for the application file, and storage information for the EPG file, and generates a synchronization file comprising the storage information for the A/V file, the storage information for the application file, and the storage information for the EPG file to synchronize the A/V file, the application file, and the EPG file; and
    a storage unit which stores the A/V file, the application file, the EPG file, and the synchronization file, in non-volatile storage,
    wherein the storage information for the A/V file, the storage information for the application file, and the storage information for the EPG file comprise directory location information specifying directories where the A/V file, the application file, and the EPG file, respectively, are to be stored, and
    wherein the storage information for the A/V file and the storage information for the application file are information not corresponding to any information provided in the EPG file.

2. The apparatus of claim 1, wherein the synchronization file comprises an Extensible Mark-up Language (XML) file that correlates the A/V file, the application file, and the EPG file with one another.

3. The apparatus of claim 1, wherein the synchronization file comprises a metadata file that correlates the A/V file, the application file, and the EPG file with one another.

4. A method of storing a broadcast program, the method comprising:
    generating an audio/video (A/V) file, an application file, and an electronic program guide (EPG) file by processing A/V signals, application information, and EPG information, respectively, which are included in an broadcast program transport stream;
    generating a synchronization file comprising storage information for the A/V file, storage information for the application file, and storage information for the EPG file, and that is used to synchronize the A/V file, the application file, and the EPG file; and
    storing the A/V file, the application file, the EPG file, and the synchronization file, in a storage unit, in non-volatile storage,
    wherein at least one of the generating an A/V file, an application file and an EPG file, and the generating of a synchronization file, is performed by a processor,
    wherein the storage information for the A/V file, the storage information for the application file, and the storage information for the EPG file comprise directory location information specifying directories where the A/V file, the application file and the EPG file, respectively, are to be stored, and
    wherein the storage information for the A/V file and the storage information for the application file are information not corresponding to any information provided in the first EPG file.

5. The method of claim 4, wherein the synchronization file comprises an Extensible Mark-up Language (XML) file that correlates the A/V file, the application file, and the EPG file with one another.

6. The method of claim 4, wherein the synchronization file comprises a metadata file that correlates the A/V file, the application file, and the EPG file with one another.

7. A non-transitory computer-readable storage medium storing a computer program for executing a method comprising:

generating an audio/video (A/V) file, an application file, and an electronic program guide (EPG) file by processing A/V signals, application information, and EPG information, respectively, which are included in an broadcast program transport stream;

generating a synchronization file comprising storage information for the A/V file, storage information for the application file, and storage information for the EPG file, and that is used to synchronize the A/V file, the application file, and the EPG file; and storing the A/V file, the application file, the EPG file, and the synchronization file, in non-volatile storage, wherein the storage information for the A/V file, the storage information for the application file, and the storage information for the EPG file comprise directory location information specifying directories where the A/V file, the application file and the EPG file, respectively, are to be stored, and wherein the storage information for the A/V file and the storage information for the application file are information not corresponding to any information provided in the EPG file.

8. An apparatus for storing a broadcast program, the apparatus comprising:

a synchronization unit which generates a synchronization file comprising storage information for an audio/video (ATV) file, storage information for an application file, and storage information for an electronic program guide (EPG) file, and that is used to synchronize the A/V file, the application file, and the EPG file; and a storage unit which stores the A/V file, the application file, the EPG file, and the synchronization file, in non-volatile storage, wherein the storage information for the A/V file, the storage information for the application file, and the storage information for the EPG file comprise directory location information specifying directories where the A/V file, the application file and the EPG file, respectively, are to be stored, and wherein the storage information for the A/V file and the storage information for the application file are information not corresponding to any information provided in the first EPG file.

9. A non-transitory computer-readable storage medium storing a computer program for executing a method comprising:

generating a synchronization file comprising storage information for an audio/video (A/V) file, storage information for an application file, and storage information for an electronic program guide (EPG) file, and that is used to synchronize the A/V file, the application file, and the EPG file; and storing the A/V file, the application file, the EPG file, and the synchronization file, in non-volatile storage, wherein the storage information for the A/V file, the storage information for the application file, and the storage information for the EPG file comprise directory location information specifying directories where the A/V file, the application file and the EPG file, respectively, are to be stored, and wherein the storage information for the A/V file and the storage information for the application file are information not corresponding to any information provided in the first EPG file.

10. The apparatus of claim 1, wherein the signal processing unit deletes at least a portion of duplicate application information received in the broadcast program transport stream.

11. The apparatus of claim 10, wherein the signal processing unit compares the application information in the broadcast program transport stream with application information stored in the application file retrieved using the storage information.

* * * * *